United States Patent

[11] 3,571,689

| [72] | Inventor | William L. Wise |
| | | Mountain View, Calif. |
| [21] | Appl. No. | 798,969 |
| [22] | Filed | Feb. 13, 1969 |
| [45] | Patented | Mar. 23, 1971 |
| [73] | Assignee | Tydeman Machine Works, Inc. |
| | | Redwood City, Calif. |

[54] CIRCUIT FOR SUPPLYING CONTROLLED DC LOADS FROM POLYPHASE AC SOURCES
22 Claims, 8 Drawing Figs.

| [52] | U.S. Cl......................................... | 321/5, |
| | | 321/18, 321/47, 318/227, 318/345 |
| [51] | Int. Cl........................................ | H02m 7/00 |
| [50] | Field of Search......................... | 318/227, |
| | | 231, 345; 321/5, 18, 47 |

[56] References Cited
UNITED STATES PATENTS

| 3,336,520 | 8/1967 | Miyairi et al................. | 321/5 |
| 3,458,796 | 7/1969 | Cassady........................ | 321/5 |
| 3,461,369 | 8/1969 | Bonikowski et al.......... | 318/227X |
| 3,470,444 | 9/1969 | Bixby............................ | 321/5 |

FOREIGN PATENTS

| 1,175,356 | 8/1964 | Germany..................... | 321/5 |

*Primary Examiner* — William M. Shoop, Jr.
*Attorney* — Fryer, Tjensvold, Feix, Phillips and Lempio ABSTRACT: A unique control circuit for supplying DC loads from polyphase alternating current sources incorporates rectifying switching means in a transformer output which are connected in series with a DC load wherein the reference voltage is the load voltage and associated trigger circuits control the firing angle of rectifying switching means relative to that reference voltage and a command signal, so that phase-to-load switching is accomplished as and only when the individual phase voltage approaches the reference voltage. Each phase of the source has two rectifying switching means associated therewith whereby current can be made to flow in both directions through the load from the source. When adjacent phases are 60 or less electrical degrees apart high average unidirectional currents in the load are possible since the load current can become continuous where the next adjacent phase turns on to assume load current under high-current switching conditions before the preceding phase switching element turns off. Therefore, current is then only limited essentially by load resistance (instead of the usual reactance) and source impedance which is a substantial power conversion advantage in the achieving of precise DC motor control. This is achievable with SCR-type switching devices, without input phase-to-phase sorting problems, because triggering can only occur when phase voltage magnitude is approaching E-load, either from above or below.

INVENTOR:
WILLIAM L. WISE

INVENTOR:
WILLIAM L. WISE

CIRCUIT FOR SUPPLYING CONTROLLED DC LOADS FROM POLYPHASE AC SOURCES

BACKGROUND OF THE INVENTION

There is a large demand for simple inexpensive control circuits to control drive motors accurately in both speed and direction from AC or DC power sources. Some of this demand exists in the machine tool field, such as for a spindle motor, where very precise speed and direction control is required for machining operations. In these operations, the torque load on the spindle motor can vary during cutting operations which, along with a wide spectrum of required speed changes and reversals in direction make motor control difficult. Of course, there are many other areas where similar requirements are found.

Difficulty is often experienced with existing motor control systems since varying loads, at least cause a temporary undesirable corresponding change in speed because of the system's inability to increase current sharply to correct minor speed error or unavailability of the necessary control gain. This is a problem in DC drive motors where the AC current is rectified, as well as in AC induction motors where a new frequency is generated with a cycloconverter to provide the desired or selected synchronous speed. Such prior art systems often have low control loop gain to maintain stability which, with variations in torque loading, often causes relatively large variations above and below the desired or selected motor speed or position.

The instant invention employs innovations supplying precision motor control at a cost only equal to or slightly more than low quality currently available control systems. Further, it can respond faster and over a wider range of heavy torque variation, since at the high-current levels where novel switching techniques are employed to cause the current to become continuous, the current is limited primarily by resistance and not reactance. Servoloop gain in the instant invention will normally be approximately 70 db. (3000X) and can be easily increased by merely increasing the Hz. of the source or the number of phases of the source through a phase-multiplying transformer, without any change in the basic circuits, which is an added advantage.

SUMMARY OF THE INVENTION

The instant invention provides a simple and efficient control circuit with high control gain for supplying controlled DC to loads directly from polyphase AC sources by employing the average DC load voltage as a reference common to all the phases, connecting a plurality of controlled rectifier means in series with the load and the output of a polyphase transformer and utilizing control circuit means to control the conduction (firing angle) of the controlled rectifiers relative to the reference voltage in a manner that a change in the direction or magnitude of current flow can be accomplished during the interval of each succeeding phase without a change of polarity of such phase. Switching adjacent phases of like polarity relative to reference voltage can achieve high, substantially continuous load currents, which are only limited by the resistance of the load and related circuits. Therefore, in many applications, current limiting circuits are essential.

The control circuit includes means for limiting a parameter, for example current, during single cycle input, long term steady state conditions and when the conditions are such that the load current does not decrease to zero between conduction of the individual rectifying means. The last feature is most important because during two-phase conduction the load reactance changes and becomes essentially resistive in character. Unless provisions are made to accommodate the resulting change in sensitivity the instantaneous current flow can increase to dangerous levels and control circuit stability can fail.

In components, the invention will usually employ a polyphase-multiplying transformer having at least three center-tapped secondaries, each having the center-tapped connection common to one side of a controlled DC load and two oppositely disposed and parallel arranged controlled rectifiers connected in series with the opposite side of the controlled DC load and one of the leads of each center-tapped secondary. Trigger circuit means employed for each pair of parallel-connected controlled rectifiers, have as phase reference inputs the voltage of the phase being controlled, the average voltage level of the DC load, the power supply reference and a command signal whereby the switching of the controlled rectifiers to a conducting state is accomplished only when the voltage of the controlled individual phase is approaching the load or reference voltage from either a lower or higher voltage. Current limiting circuits are also employed.

BRIEF DESCRIPTION OF THE DRAWINGS

The above advantages of this invention will be more easily understood from the following detailed description of a preferred embodiment when taken in conjunction with the attached drawings in which.

DESCRIPTION OF THE PREFERRED EMBODIMENT

Figure 1:
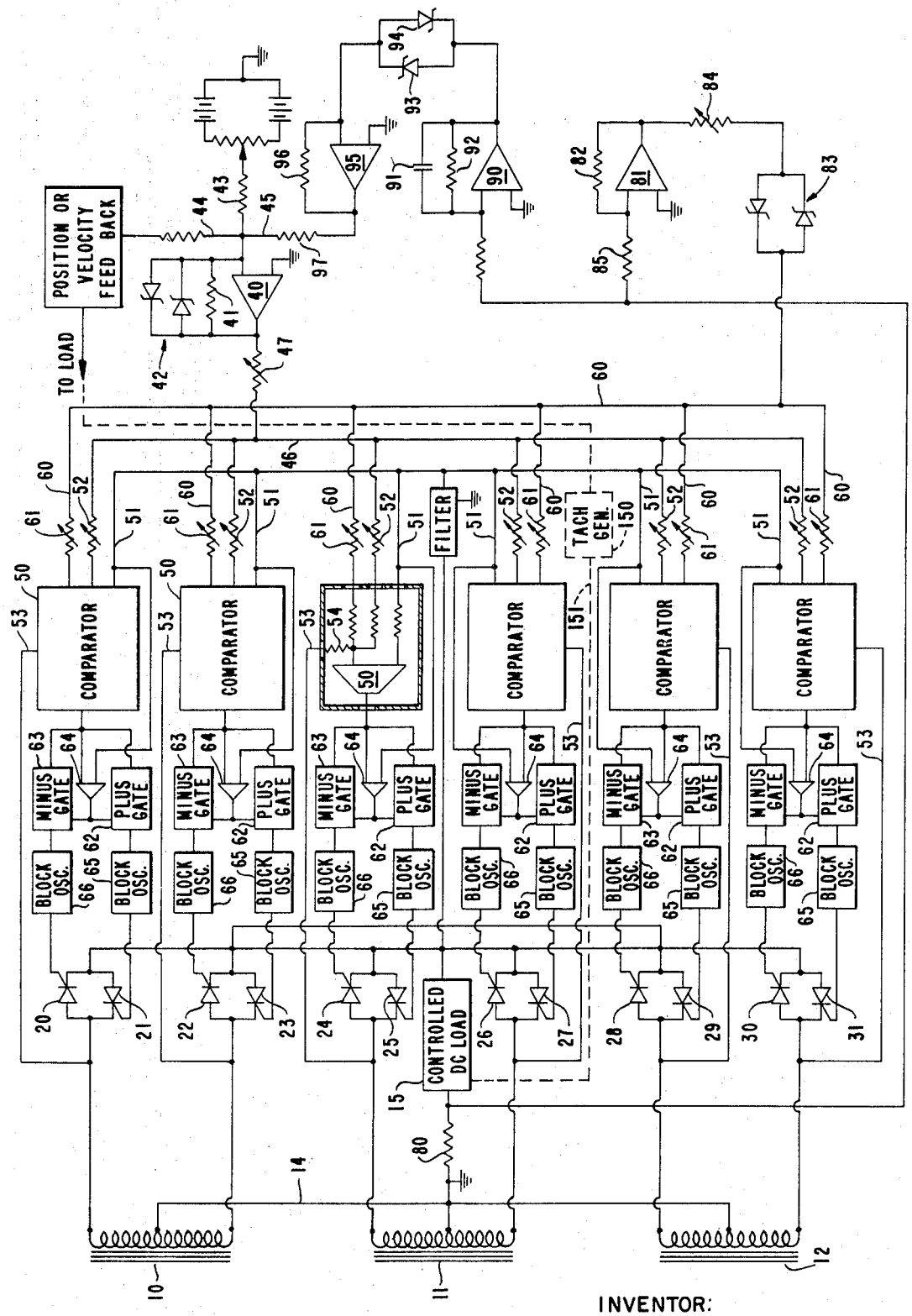
FIG. 1 is a circuit of diagrams for supplying a DC load that requires current flow in both directions from a multiphase AC source.

One of the important circuit techniques employed in the instant invention involves two rectifying switching means, such as silicon control rectifiers (SCR's), which can be connected in parallel but opposite in polarity, with each phase of a multiphase AC source with both rectifying means being employed to conduct during the same polarity (half cycle) of that input waveform phase. This is accomplished by establishing the load voltage as the power supply reference voltage for both SCR's (anywhere + or — with respect to the ground of the waveform) such that triggering of both SCR's can occur only when their input waveform phase voltage approaches the load voltage. Thus, it can be said one SCR will conduct, if triggered, as the waveform voltage of the phase is approaching the load voltage from a lower voltage and the opposite polarity SCR will conduct when the waveform voltage is approaching the load voltage from a higher voltage. In the first case, if a motor is being controlled, current will tend to flow from the load to the source while the reverse is true in the latter case.

It is important to note that a conducting SCR in this (or any other) circuit at this time in the state-of-the-art will conduct until its anode-cathode voltage goes to zero or negative. This will occur when the associated input waveform voltage drop to or below the load reference voltage, or a succeeding, adjacent waveform phase voltage of like polarity is switched to the load which produces an instant negative anode-cathode voltage for the conducting SCR, turning it off.

Obviously, in a dynamic system, such as a spindle motor, the motor can be retarded or increased in speed utilizing proper switching of the individual waveforms from the phase-multiplying transformer relative to the reference voltage or its equivalent Thus, for example, with a three-phase power source, the transformer will supply six available positive-going one-half power phases per input cycle that are employed to control the spindle motor in a "FWD" direction while the six negative-going one-half power phases can be employed to control the motor in the "REV" direction. Dynamic braking and speed regulation are available in either direction without any added components, "dead time," or required "blocking" of any kind nor possiblity of same shorting.

In addition, the invention employs a new switching technique for controlling adjacent phases from the phase-multiplying transformer which essentially makes the current through the DC load continuous, and thereby causes the primary current limiting factor in an inductive load to change from reactance to essentially resistance and allowing the incremental current to be limited by input phase circuit impedance which might be a fraction of load impedance, including load reactance.

For example, when employing six phase power per cycle from the phase-multiplying transformer, the available power phases will normally be 60 electrical degrees apart (referenced to the input waveform) and the voltages of two adjacent phases of like polarity can be approaching the load voltage at the same time so both phases could be connected to the load at the same instant, even though the waveform voltage of the subsequent phase is at a higher voltage, relative to that of the load voltage during FWD conduction, than the waveform voltage of the preceding phase. Under such conditions if the subsequent phase is switch-connected to the load in the circuit previously described, its voltage will be higher than either the DC load voltage or the waveform voltage of the prior conducting phase and it will therefore immediately—but uneventfully—cause the latter's SCR to turn off without an interruption of the load current. Thus, the load current will then become essentially continuous, and load circuit reactance no longer limits current flow changes which may allow incremental load current to increase by a factor of 30 or more, depending on loop reactance and resistance parameters. Obviously, an overcurrent situation could occur at this time and control circuit triggering the SCR's must include limiting circuits to prevent damage to the SCR's, the load, and other components in the circuit when this multiple phase conduction occurs. Multiple phase conduction represents a departure from prior art control systems and results in many of the advantages available in the instant invention.

Therefore, part of this invention concerns a novel circuit for connecting a DC load to a polyphase AC source through a phase-multiplying transformer with controlled rectifiers via a control circuit for switching the controlled rectifiers in such a circuit in a manner to maintain precise control of dynamic DC loads at the high-current levels when "two-phase" switching occurs which changes circuit sensitivity response and loop gain.

Referring now to FIG. 1 there is shown the illustrative circuit for controlling a direct current inductive load directly from a three-phase source power. More particularly, since three-phase AC is commonly available from power companies, a phase-multiplying transformer with three secondaries 10—12 is employed to convert the normal three-phase power supply into an equivalent six-phase power supply. The three center-tapped secondaries 10, 11, and 12 are all connected via their center taps to a common lead 14 which is connected to one side of the load 15 via shunt resistor 80. This common lead is also connected to (chassis) ground for a zero waveform reference.

SCR's 20, 22, 24, 26, 28 and 30 control the flow of current through the load in the "FWD" direction, while the remaining SCR's 21—31 control the flow of current in the "REV" direction. A pair of SCR's are connected in parallel but oppositely poled, for example, 20 and 21, for each lead of each secondary and are triggered relative to a half of the waveform voltage on their common connection to the transformer secondary. The load may be a substantially resistive load as, for example, a heater that requires a current flow in only one direction or an inductive load, such as a spindle motor, wherein the current flow must be reversed to change the direction of rotation or to dynamically slow it. Of course in the case of a load requiring only one DC polarity, the circuit shown in FIG. 2 and described below may be employed.

The trigger control circuit comprises an error amplifier 40 which is illustrated as being an operational amplifier having a resistance 41 and a pair of opposite poled Zener diodes 42 disposed in its feedback circuit. Thus, the error amplifier will operate as a summing circuit to amplify the difference between the input command voltage and a feedback voltage representing the average DC load voltage, position, or velocity, as required. The input to the amplifier comprises a voltage on lead 43 that is the command signal, a second voltage on lead 44 that is the controlled parameter feedback signal and third signal on lead 45 that is the current limiting or protective signal described below. The command signal on lead 43 has the opposite sign from the feedback signal 44 and the command signal can be either positive or negative depending on the desired direction of current flow through the load. When a DC motor is the load, the command signal will set both the direction of rotation and speed of rotation. The output of the error amplifier is coupled by means of a lead 46, having a variable resistance 47 disposed therein, to the comparator circuits 50.

The comparator circuit for only one waveform of one of the multiple phases will be described since the others are identical and it comprises a voltage comparing circuit 50 which is designed to switch when the sum of the input voltages received from the various sources cross zero relative to an attenuated average DC load voltage referred to as $E\alpha$ on lead 51. The voltage comparing circuit is an integrated circuit, similar to a Schmitt trigger circuit, and is designed to trigger at a set voltage difference level and remain triggered on until the sum of its input voltages again falls below this reference level, providing essentially a squared output pulse. The duration of the squared pulse is varied by the control circuitry to control both the power and voltage of the load. The input to each comparing circuit from the error amplifier 40 contains an adjustable resistor 52 which is used to balance the multiple circuits and to avoid attempted triggering at an input waveform level higher than input peak voltage.

The comparing circuit 50 also receives a variable voltage signal on lead 53, having a resistance 54 disposed therein, from a waveform of the phase which the particular comparator circuit is controlling. Since some voltage spikes may occur on the waveform voltage, a filter may be employed in addition to the resistance 54. Each comparing circuit also may receive a current limiting voltage from a current limiting circuit described below over a lead 60 having a variable resistance 61 disposed therein for adjustment. Normally, unless the current level is high, requiring limiting, a signal will not appear on this lead. It is essential that a signal appear on this lead during two-phase conduction.

The comparing circuit will switch when the sum of input voltages exceeds the reference voltage $E\alpha$, by the threshold voltage of the comparing circuit. The various voltage inputs can either add or subtract from the phase voltage from the transformer. Thus, the error voltage from the error amplifier 40 can either increase or decrease the time period during which each SCR conducts by firing it on sooner or later relative to waveform of the phase being controlled and appearing on lead 53. Likewise the current limiting voltage can be used to control the firing point or angle of each SCR. The variable resistances are used to individually adjust the operation level of each input of the comparator circuit if required.

The signal from the voltage comparing circuit is supplied to two gates 62 and 63 that are indicated as plus or minus gates, respectively. The two gates are also supplied with a signal from a difference amplifier 64 that compares to the error signal with $E\alpha$ and supplies the difference to the two gates. This amplifier insures that only one gate can open regardless of noise or other disturbances in the output of the comparator. The two gates are coupled to separate, conventional blocking oscillators 65 and 66 that supply the pulses required to trigger the SCR's 24 and 25. If the noise levels are low these gates can be eliminated.

Figure 3:
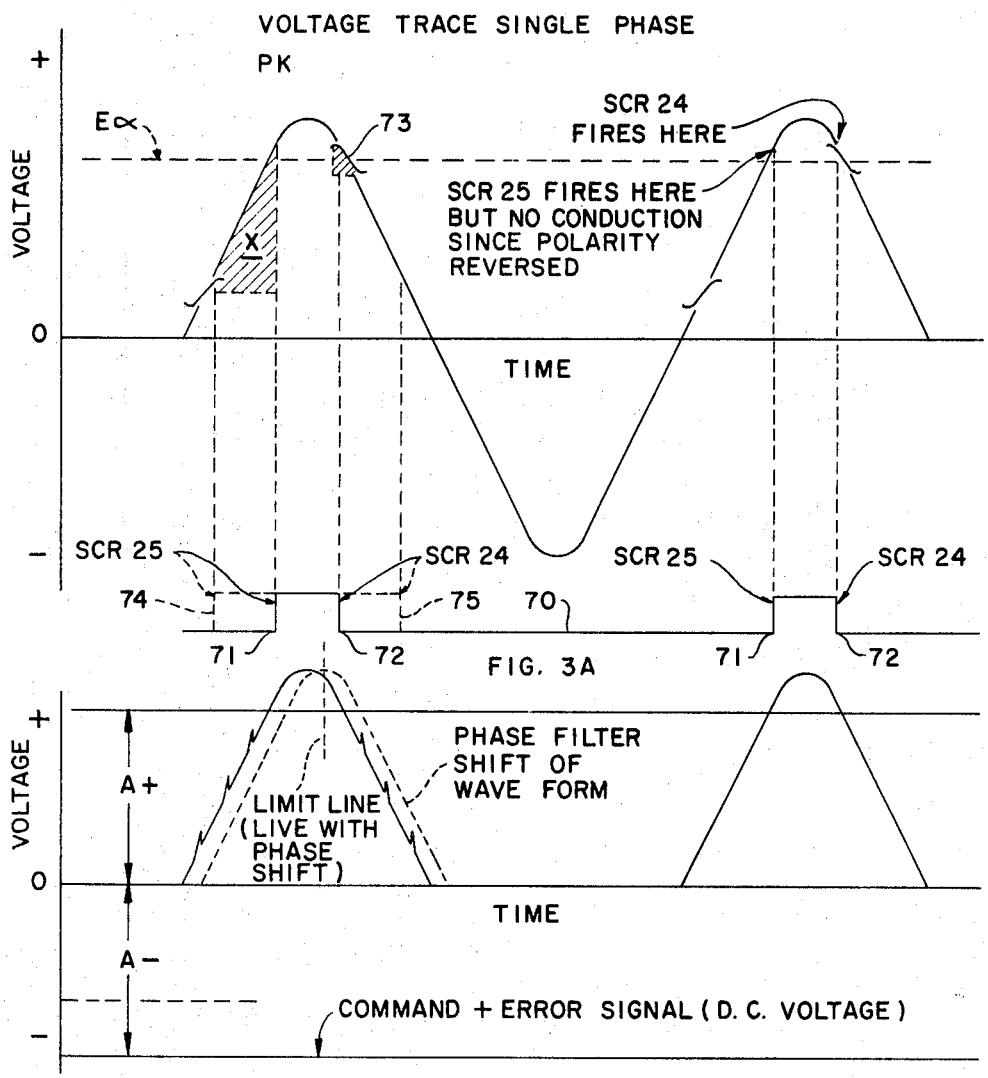
FIGS. 3A and 3B are a series of waveforms for a representative phase input.
Figure 4:
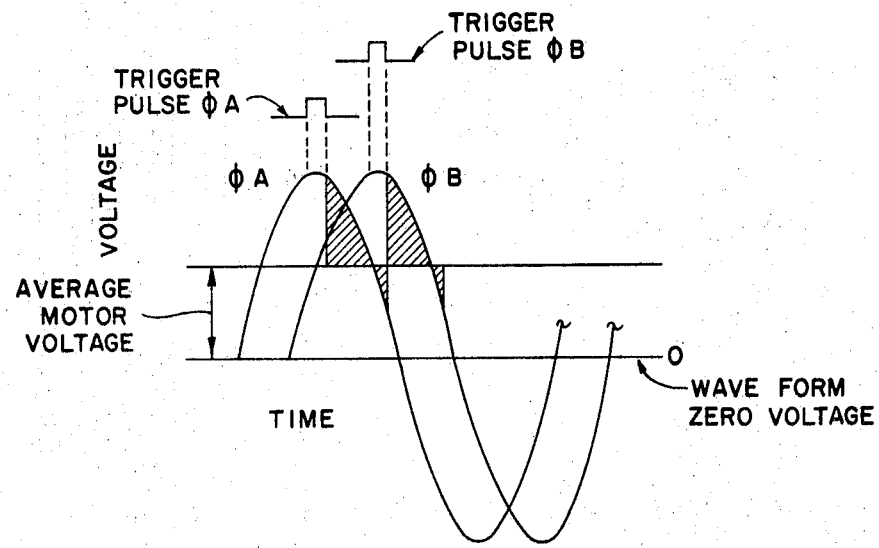
FIG. 4 is a waveform showing the period of conduction in multiple adjacent phases.

The operation of the circuit when the load is a motor can be thus understood by referring to FIGS. 3 and 4 wherein a voltage waveform of one phase of the six phases is illustrated; and more particularly, the waveform of the phase from the secondary of the transformer connected to SCR's 24 and 25. Illustrated in FIG. 3A is a squared pulse 70 which is the output signal of the comparing circuit 50 and blocking oscillator. The pulse will change level whenever the voltages on leads 46, 53, and 60 provide a voltage sum which crosses $E\alpha$ equivalent from either direction. Thus, a + going phase crossover point, point 71, causes a positive pulse level change (and SCR trigger spike) which falls, point 72, when the phase waveform potential returns approximately to the level of the point 72. Point 72, time of 70 pulse change, is used to trigger the blocking oscillator 66 which will supply a pulse to the conduction (gate) electrode of the SCR 24. The gates 62 and 63 control the proper passing of a pulse from the comparing circuit to the blocking oscillators. Thus, when FWD power is required the minus gate 63 opens while the positive gate 62 opens when the FWD direction is to be braked. This will cause the SCR to conduct or transmit power from the power supply to the motor in a "FWD" direction as indicated. The SCR will continue to conduct until the amplitude of the waveform voltage of the phase falls below the instant load reference voltage $E\alpha$ cutting off the SCR. Thus, the SCR 24 will conduct during the crosshatched interval 73 for the FWD direction shown.

The above description relates to the operation of the armature in a forward direction where the actual speed of the motor is below the desired speed. In a similar manner where the motor speed is greater than the desired speed, the error circuit will supply a more positive voltage signal, moving squared phase 70 toward timing points 74 and 75 which will cause SCR 25 to conduct in the crosshatched interval X, slowing the motor.

The appearance of an opposite polarity error signal on lead 46 will add to the phase voltage and thus cause the comparing circuit to fire earlier in the phase being controlled such as at timing point 74 in FIG. 3A. This positive going pulse will be passed by the positive gate 62 and trigger blocking oscillator 65. The blocking oscillator 65 will supply a pulse to the conduction electrode of SCR 25 and cause it to conduct. The SCR 25 is reversed from SCR 24 and since the load voltage $E\alpha$ exceeds the phase voltage, current will flow back to the transformer and the source. The backward flow of current will continue until the phase voltage exceeds the instant load voltage at which time the SCR 25 will cease to conduct. As indicated, this will occur in crosshatch area X.

From the above description it is seen that a negative-going pulse will trigger the SCR 24 while a positive-going pulse will trigger SCR 25. While the positive-going pulse 71 will trigger SCR 25, it won't conduct because at this point in time the waveform voltage of the phase exceeds the load voltage and SCR 25 is reverse biased. In a similar manner the negative going pulse 75 will trigger SCR 24 but it won't conduct since the phase voltage is less than the load voltage.

Each one of the six phases is controlled in an identical manner. Of course, in motor control circuits the six positive-going phase halves are used to control the motor in the "FWD" direction while the six negative-going phase halves are used to control the motor in the "REV" direction.

Referring again to FIG. 1 there is shown a means by which the long time current flow in the circuit can be limited, as well as a means for limiting the instantaneous current flow when adjacent phases, i.e., two phases simultaneously conduct. These limiting circuits include a shunt resistor 80 disposed in the lead from the transformer to the armature of the motor with the voltage drop across the resistor 80 being used as a measure of the current flow through the armature. This voltage drop is supplied to an amplifier 81 whose output is supplied to the comparing circuits to adjust the point at which they trigger if safe current levels are exceeded. This amplifier has a resistance 82 in its feedback circuit and a pair of opposite poled Zener diodes 83 in its output circuit. Thus, the amplifier operates as a voltage amplifier and supplies a signal via lead 60, having variable resistances 84 and 61 disposed therein, to each comparator 50. It is effectively in-circuit only when load current has not decreased to zero at the time the next phase is connected to the load. It provides an effective attenuation to the error amplifier loop gain to offset the greatly increased power sensitivity offered by 2Φ operation where effective impedance to current in the armature abruptly drops from circuit reactance to circuit resistance, a change typically in the range 30X, or 30 db.

The long time current control or limiting is supplied by means of an operational amplifier 90 which also is coupled to the resistor 80 to measure its voltage drop. This operational amplifier has a capacitor 91 and resistance 92 disposed in its feedback circuit in order that it will operate as an integrating circuit. The integration time constant should be chosen to provide the desired time delay for the desired current limiting response of the circuit. The output of this amplifier is coupled to oppositely poled Zener diodes 93 and 94 that are coupled to a second operational amplifier 95. The use of the Zener diodes 93 and 94 provides a means for supplying a voltage holdoff point for the long time current limiting circuit. Zener diodes, of course, will not conduct until their breakdown voltage level is reached, thus they will eliminate both positive and negative signals that are below their breakdown voltage level. Amplifier 95 is provided with a feed back resistance 96 in order that it may sum the signal passed by the Zener diodes with the ground or reference signal and supply the sum through a resistance 97 to the input of the error amplifier 40. The signal supplied will reduce the effective input signal to the error amplifier and thus reduce the magnitude of the error signal which in turn reduces the incremental voltage level and gain to the motor and the incremental current flow therein as required to protect the circuit.

The only time the 2Φ current limiting circuit operates to limit the current flow is when two or more phases are instantaneously conducting. When two phases instantaneously conduct the incremental current flow in the load may increase by a factor of 30 and is limited only by the resistance of the circuit. In contrast during the single-phase conductance the current is limited primarily by the reactance of the circuit since the load current falls to a zero level between the conduction from each subsequent phase. The single-phase pulse current flow is limited by the variable resistances 47 and 52 that are used to balance the performances of single-phase conduction of each of the six SCR's in the direction group along with the output from amplifiers 90 and 95 for long time current limiting.

During 2Φ conduction amplifier 81 will supply an output from the sum of the voltage drop across resistance 80 and the ground voltage and at the breakdown voltage of the Zener diodes 83, its output circuit will be connected to each comparator circuit 50. The actual voltage output of the amplifier 81 will, of course, depend upon the valve of the feedback resistance 82 and the input resistance 85. The voltage output of amplifier 81 of course will normally oppose the error voltage from the error amplifier 40 and limit the 2Φ current flow as well as loop gain in the circuit.

As indicated above, the long time current is limited by supplying a voltage to the error amplifier when the output of the integrating circuit exceeds the breakdown of the Zener diodes 93 and 94. The Zener diodes should be selected so that under normal conditions the output of the amplifier 90 does not exceed their breakdown voltage and this circuit can operate in both modes, 2Φ and single-phase conduction.

Figure 2:
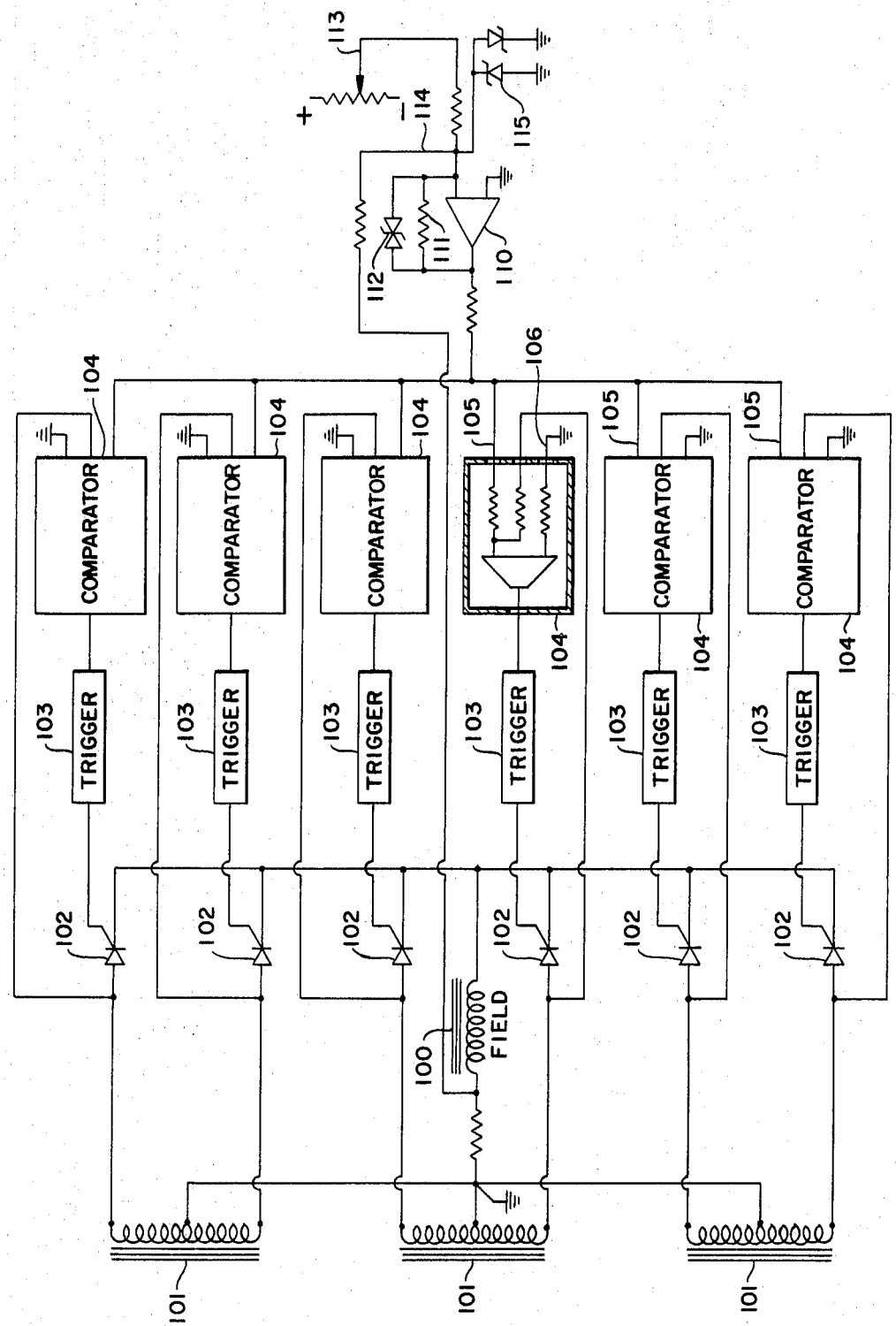
FIG. 2 is a circuit diagram for supplying a DC load that requires current flow in only one direction from a multiphase AC source.

Referring now to FIG. 2 there is shown a simplified control circuit using only six SCR's to control the flow of current in one direction. This circuit is useful where it is unnecessary to reverse the current flow as, for example, in a resistance load, such as a heater, or the field of a motor.

The motor field 100 is illustrated and is supplied from a six-phase power supply (transformer) 101 by means of a plurality of SCR's 102 whose conduction is controlled by trigger circuits 103. Trigger circuits 103 in turn are controlled by a comparing circuits 104 which receive input command signals via lead 105 and compares it with the control parameter signal on lead 106. The SCR triggers 103 can be the same as that described above except that it need only control six SCR's since the current flow through the field is always in the same direction.

A command signal on lead 105 is provided by an amplifier 110 having a resistance 111 and Zener diode 112 in its feedback circuit. The amplifier operates as a summing amplifier to supply an amplified output signal equal to the difference between a signal on lead 113 representing a desired voltage and a signal on lead 114 representing the controlled parameter. A pair of parallel oppositely poled diodes 115 are disposed to limit the magnitude of the signal representing the desired voltage.

OPERATION

As explained above with reference to FIG. 1 and the waveforms shown in FIGS. 3A and 3B, the present control system operates to control the firing point or angle of each SCR prior to its crossover point from voltages above or below the voltage ($E\alpha$) supplied to the load whereby a control parameter in the load is maintained. In the case of a DC motor the control circuit will control both the speed and direction of rotation. The firing point or angle after which each of the SCR's conduct is determined by the magnitude of the signal received from an error circuit along with auxiliary control signals. The error circuit in turn compares a command signal with a signal representing the actual voltage or current demand of the load and supplies the difference or error to the control circuits of the SCR's. In a similar manner the amplitude of the error signal is further adjusted to limit the maximum current flow in the circuit during both single-phase and two-phase conduction.

Also as described with relation to FIG. 1, the load voltage stops the conduction of the SCR's as their controlled waveform voltage crosses over the instantaneous load voltage, $E\alpha$. As is well known, once an SCR starts to conduct it will remain in a conductive stage until the voltage of the load being powered exceeds the forward input voltage being controlled by the SCR, which is the situation during this crossover, or during the 2Φ conduction situation.

Illustrated in FIG. 3B is the phase shift introduced when the phase reference signal supplied to the comparing circuit 50 is filtered to remove the noise and other phase firing caused spikes. Also shown is the unfiltered phase reference signal containing the noise spikes. Normally simple filtering may introduce a phase shift of 15 electrical degrees more or less but will not interfere appreciably with the operation of the comparing circuit.

Figure 5:
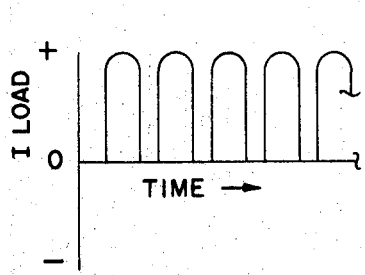
FIG. 5 is a waveform showing the steady state load current flow for single phase (low current) conduction.
Figure 6:
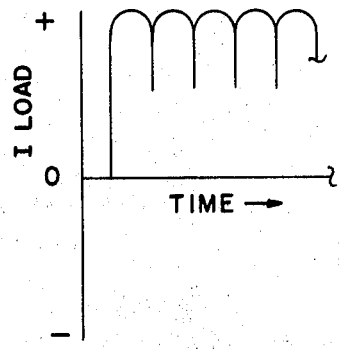
FIG. 6 is a waveform showing the steady state current for multiple adjacent phase (high current) conduction.

Illustrated in FIGS. 4—6 are the voltage and current waveforms for two-phase conduction and steady state conditions of current flow for single- and two-phase conduction. As shown in FIG. 4, ΦB starts to conduct prior to turnoff of ΦA and in fact at high power levels ΦB will start conducting to the load and actually turn off ΦA. As shown in FIG. 5 the steady state current flow during single phase conduction decreases to zero between adjacent conduction cycles. The reactance of the circuit will usually be the prime limiter of circuit current in this mode of operation. In contrast when multiple or two phases conduction is occurring, the steady state current flow appears as shown in FIG. 6 since the next adjacent phase turns on prior to the turnoff of the preceding phase. Because the current flow now does not fall to zero the circuit will remain substantially resistive to incremental voltage and, therefore current changes. See FIG. 7. Thus, the unrestrained circuit would be current limited only by the size of the SCR's and the ability of the components to pass the high currents.

Figure 7:
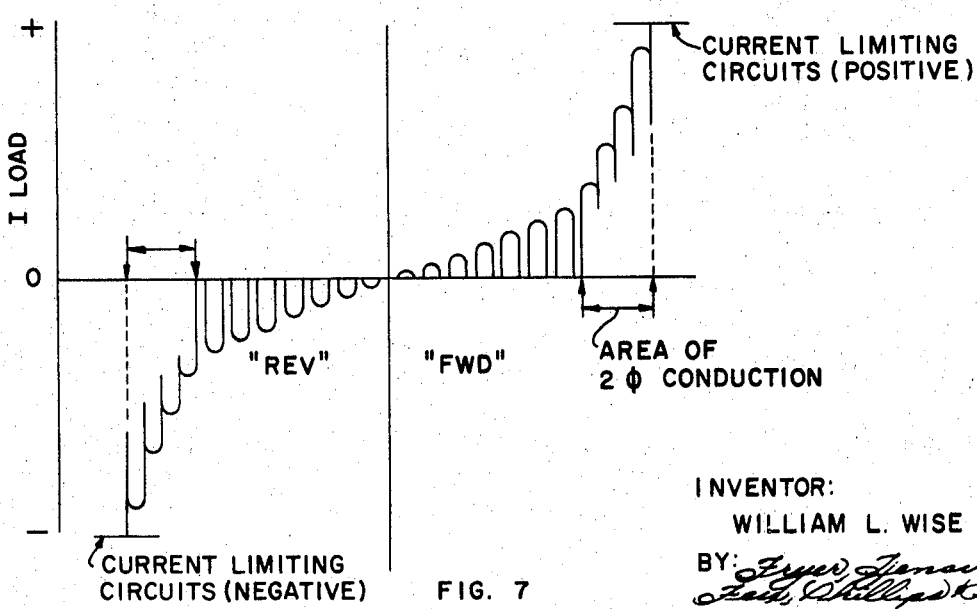
FIG. 7 is a waveform showing the change in steady state current flow when the conduction changes from single-phase to two-phase conduction.

A combination current trace for single- and two-phase conduction is illustrated in FIG. 7. As shown, only the current carrying ability of the load loop components would limit the uncontrolled current during the two-phase conduction area. Thus, it is necessary to include adequate current limiting circuits in the control circuit. While the system is in two-phase conduction the amount of incremental power that can be transferred or power sensitivity is approximately 30 times or more that during single-phase conduction and represents a breakthrough in power conversion and control recognition.

While the above system is described with relation to the use of silicon controlled rectifiers for the rectifying circuit, obviously other types of rectifiers, such as mercury vapor rectifiers and triacs could also be used.

The important features of the invention are:
1. the controlling of the firing point or angle at which two paired rectifiers conduct during each positive or negative waveform period of a multiple phase input by triggering only when the source voltage "approaches" the load or reference voltage,
2. the recognition of, and controlling power sensitivity change when 2Φ conduction is initiated, to maintain optimum loop gain and bandwidth, and
3. increased dynamic response by raising gain crossover frequency consistent with the polyphase input and change from 1Φ to 2Φ conduction.

When employing the concepts disclosed herein for a motor requiring precision speed control, such as a spindle motor, the actual motor speed may be sensed by a transducer, such as a tachgenerator or encoder 150, driven through drive 151 as shown in dotted lines in FIG. 1. Its DC output is summed with the inputs to error amplifier 40 to provide a closed loop control with good dynamic response.

The closed loop gain can exceed 60 db. with a transformer output of six-phase 60 Hz. using a 60 Hz. loop crossover frequency since the circuit will have available 360 control pulses a second for regulation of both acceleration and deceleration. At the high-current level where two SCR's conduct instantaneously so there is no gap in the current flow, 360 AC waveforms per second will be supplying continuous power. At stable conditions, speed regulation will require between 360 and 720 SCR conductions per second: 360 for increased speed, and 360 for decreased speed, or 2 SCR firings on each half-waveform of each phase source cycle. It should be appreciated here, that increasing the number of phase inputs to the transformer or increasing the Hz., or both, will proportionately allow improvement in the precision of the system by making available more control pulses and a higher loop gain and crossover frequency. The only limit to employing these techniques is the maximum switching rate of the SCR's.

In general the invention provides a novel control circuit for conversion of a multiple phase AC input voltage to a controlled DC output parameter (voltage, current, power or other) by connecting a polyphase transformer to an AC source or input voltage to multiply the frequency by a factor of 2 or more and connecting a plurality of controlled rectifiers in the output of the transformer in series with a load so the rectifiers can be switched as the voltage in any given phase waveform "approaches" a selected reference voltage whereby the DC output parameter is continuously adjusted toward or maintained at a desired level. With proper circuit design it is possible to switch in a manner so a subsequent phase is connected to the load prior to the time a preceding adjacent phase "switched off" resulting in a condition of "multiple phase" conduction in which current conversion from the AC source can become substantially continuous through the load.

The error and trigger circuits are designed so that the separate switching means can be operated as each controlled phase waveform voltage approaches the potential equivalent of the controlled parameter from below or above the controlled parameter, adjusted for any required correction thereto. Thus, as the individual phase waveform voltages pass from 0° through 180°, assuming the controlled parameter is some voltage above zero and of like polarity, one switching means may connect the phase to the load as it "approaches" the parameter from a lower voltage while another switching means may connect the same phase to the load as it "approaches" the parameter from a higher voltage without any change in the polarity in the waveform voltage relative to its ground voltage. The error circuits and trigger circuits control the switching point (firing point or angle) of the several switching means relative to its controlled waveform voltage. In the control circuits special provisions must be made for accommodating dynamic changes resulting from the switching described above. Normally, protective circuitry includes overrides to limit the current and to change the control gain when a condition of multiple phase conduction occurs, which in an inductive load, results in a change of load power sensitivity of load reactance-to-load resistance ratio by a factor of 30 or more as current in the load becomes substantially continuous.

In FIG. 3B a "limit line" is indicated and circuit means can be included so the SCR's cannot trigger until the wave form voltage is "approaching" $E\alpha$ or the reference voltage. For example, if SCR 24 were fired prior to the 90° point of the waveform illustrated the waveform voltage would not be approaching $E\alpha$. Further, it should be appreciated the various modifications to the invention can be made without departing from the concepts disclosed herein.

I claim:

1. A circuit for power conversion from a multiple phase AC voltage source to controlled DC voltages smoothly from plus to minus while passing through a zero voltage without dead band comprising:

a phase-multiplying transformer having its inputs connected to the multiple phase AC voltage source, said transformer having a plurality of center-tapped secondaries;

a common lead directly connecting said center-tapped secondaries to one side of a load and controlled switching means directly serially connected between the other side of said load and each of said secondaries' other leads, each of said switching means including a pair of rectifying means connected in parallel and disposed opposite in polarity; and control means connected to each of said controlled switching means including circuits connected to said load and said secondaries which are operable to switch each of said controlled switching means through its associated pair of rectifying means only when the waveform voltage in its associated secondary connected to said pair of rectifying means is approaching the load voltage either from a lower or higher waveform voltage.

2. The circuit as described in claim 1 wherein the controlled switching means include oppositely-poled, parallel-connected SCR's as the paired rectifying means in each lead of each secondary connected therethrough to the load.

3. The circuit as defined in claims 1 wherein the circuits of the control means includes an error circuit and comparator circuits, said error circuit connected to the load to receive a signal representing load current and a command signal which are summed in an output connected to each said comparator circuit where said output is compared with an input of the instantaneous voltage of the waveform being controlled by the individual comparator circuit and a comparator output is employed to switch the controlled switching means associated therewith as the waveform voltage being controlled thereby approaches the load voltage.

4. The circuit as defined in claim 3 wherein the error circuit includes integrating circuitry having an output connected to said error circuit and an input from said load representing the average load current whereby said error circuit inputs are automatically adjusted for current level to prevent circuit damage regardless of the demand for additional power by the control circuits.

5. The circuit as defined in claim 4 wherein at least six transformer output phases per cycle of input power are being controlled by the controlled switching means and said control means includes circuits whereby a subsequent phase waveform voltage may be connected to the load prior to the time the preceding phase waveform voltage is disconnected from said load through a reversal in polarity of the anode-to-cathode of said switching means controlling said preceding phase waveform voltage causing automatic turnoff of the preceding switching means without interphase shorting and smooth load current transfer to achieve substantially continuous current in said load.

6. The circuit as defined in claim 5 wherein the load is an inductive load.

7. The circuit as defined in claim 5 wherein the control means includes a current limiting circuit having as an input a signal representing the instantaneous current in the load and an output connected to each comparator circuit whereby the inputs to said comparator circuit are modified for the increased current flow when succeeding phases are connected to said load prior to the disconnection of the preceding phase to effect current limiting.

8. The circuit as defined in claim 3 wherein each comparator output is connected to a blocking oscillator, each said blocking oscillator being connected to the switching means associated with its comparator and operable to provide a gating pulse to said switching means.

9. The circuit as defined in claim 8 wherein error gate means are connected between each blocking oscillator and its associated comparator so only one of the paired rectifying means will be provided a gating pulse at a time.

10. A control circuit for converting a multiple phase AC voltage source to a controlled DC voltage, said control circuit comprising:

a phase-multiplying transformer connected to the multiple phase AC source, each phase of said AC source being coupled to a separate primary of said transformer, said transformer having a plurality of center-tapped secondaries;

a pair of controllable rectifying means being coupled between each side of each of said secondaries, and a load and within each of said pairs of said controllable rectifying means one being disposed in opposite polarity to the other;

an error circuit connected to said load, having an electrical output from said error circuit supplying a signal related to the difference between the actual control parameter of said load and the desired value of said parameter; and a plurality of triggering circuits coupled to said error circuit, one of said triggering circuits being coupled to each of said pairs of said rectifying means to control the point when one of its associated rectifying means conducts as its waveform voltage approaches said actual load voltage from a lower voltage and the point its other associated rectifying means conducts as said wave form voltage approaches said actual load voltage of said load is adjusted to become substantially equal to the desired value of a desired control parameter.

11. The control circuit of claim 10 wherein the load is a motor connected in series with each pair of the controllable rectifying means and the common center tap of all said secondaries.

12. The motor control circuit of claim 11 wherein said rectifying means comprise rectifying elements having a conduction electrode that controls the initiation of conduction of each said rectifying means and a reversal of anode-to-cathode voltage absence a voltage on its conduction electrode will stop conduction, with at least one of the triggering circuits coupled to each conduction electrode.

13. The motor control circuit of claim 12 wherein said rectifying means are silicon-controlled rectifying means.

14. The control circuit of claim 10 wherein each of said triggering circuits includes a comparing circuit connected to the error circuit that compares said error signal plus an input from the waveform voltage of the phase of its associated rectifying means with a signal derived from the control parameter and supplies an output signal when the error signal plus phase voltage exceeds said reference signal, said output signal being utilized to separately control the conduction of its associated pair of said controlled rectifying means controlling connection of said waveform voltage to the load.

15. The control circuit defined in claim 10 which includes a current limiting integrating circuit having a long time constant, said current limiting circuit being coupled to said circuit to limit said error signal.

16. The control circuit as defined in claim 10 which includes a current limiting gain circuit having a fast response, said current limiting gain circuit being coupled to said triggering circuits to limit the point at which their associated pairs of rectifying means conduct in relationship to the current flowing in the load.

17. A spindle motor control circuit for controlling the speed and direction of rotation of a DC motor from a multiphase AC power source, said control comprising:
- a phase-multiplying transformer having a plurality of center-tapped secondaries, each phase of said power source being coupled to a separate primary winding on said transformer, and said center tap of each of said secondaries being coupled to a common lead;
- a plurality of controllable rectifying elements, a pair of said rectifying elements being disposed opposite in polarity in each lead of each secondary of said transformer, said motor being coupled between the common lead connected to said center taps of said secondaries and the output of each of said pairs of said rectifying elements;
- an error circuit connected to the load and a command unit, said error circuit supplying a signal related to the difference between the desired speed of the motor and its actual speed; and
- a plurality of triggering circuits connected to said error circuit, one of said triggering circuits being coupled to each pair of said rectifying elements and having a comparing circuit on the secondary associated with the said pair of rectifying elements to algebraically sum the error signal with a signal representing the magnitude of its controlled phase voltage and compare the sum with the signal representing the actual motor voltage to supply an output signal related to the difference between said signals to alternately control with said output signal the point at which its associated rectifying elements conduct for its controlled phase from said transformer as the waveform voltages approach the voltage of said motor whereby the actual motor speed will adjust toward and maintain the desired motor speed.

18. The motor control of claim 17 wherein said comparing circuit supplies an output signal having a squared pulse waveform with the width of the pulse being related to the difference between the sum signal and the signal representing actual motor voltage.

19. The motor control of claim 18 wherein each said trigger circuits also includes circuit means coupled to said comparing circuit for producing separate trigger pulses to separately control each conduction electrode of its associated pair of rectifying elements.

20. The motor control of claim 19 wherein said circuit means comprises two gate circuits, one of said gates opening when the pulse from the comparing circuit is moving in a positive direction, the other gate opening when said pulse is moving in a negative direction, said gates being disposed to control the conduction of the pair of rectifying elements disposed in said one-phase.

21. The spindle motor control circuit as defined in claim 18 wherein the field of the motor is powered by a similar circuit and including a phase-multiplying transformer with at least six output phases per cycle of source power from its center-tapped secondaries, said field being connected in series with a common lead to all the center taps and each of said secondaries through controlled rectifying means, control means connected to said rectifying means adapted to switch said rectifying means to connect a subsequent waveform voltage to said field prior to the time the preceding waveform of like polarity is cut off from the load to obtain high continuous DC current in said field.

22. The method of achieving high continuous unidirectional currents in controlled DC loads directly from polyphase AC voltage sources comprising:
- converting a polyphase AC voltage source to at least a six-phase output;
- commonly connecting said six-phase output to the controlled DC load in series with a plurality of controllable rectifying switching means; and
- independently switching said switching means as its controlled phase waveform voltage is approaching the load voltage from a higher or a lower voltage, each subsequent phase being connected to said load before the preceding phase cuts off from said load when approaching said load voltage with a higher waveform voltage than said load voltage.